No. 671,848. Patented Apr. 9, 1901.
F. WILCOMB.
LET-OFF AND CONTROLLING MEANS FOR KNITTING MACHINES.
(Application filed Aug. 7, 1900.)
(No Model.)
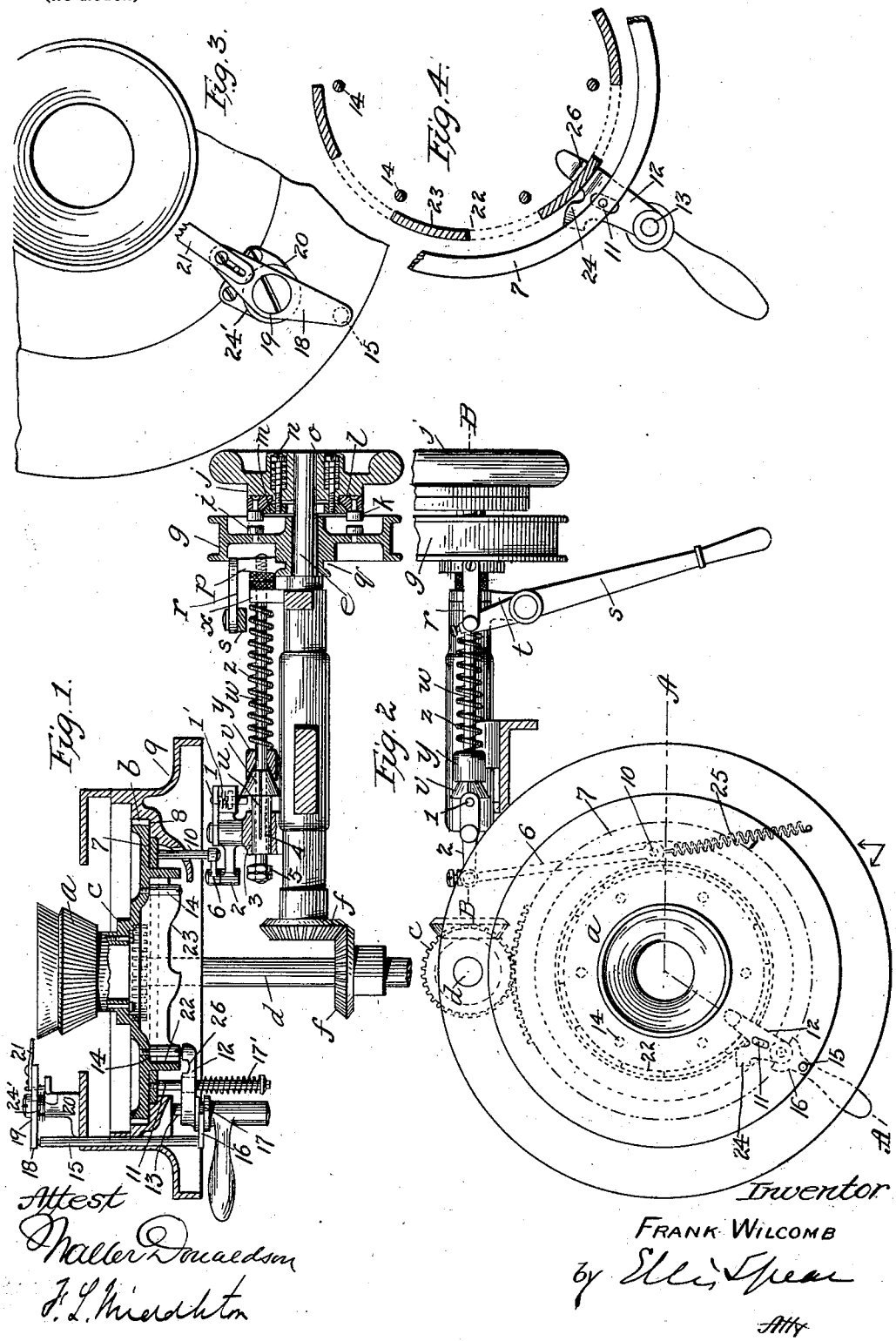
Inventor
FRANK WILCOMB
by Ellis Spear
Atty

UNITED STATES PATENT OFFICE.

FRANK WILCOMB, OF NORRISTOWN, PENNSYLVANIA.

LET-OFF AND CONTROLLING MEANS FOR KNITTING-MACHINES.

SPECIFICATION forming part of Letters Patent No. 671,848, dated April 9, 1901.

Application filed August 7, 1900. Serial No. 26,158. (No model.)

*To all whom it may concern:*

Be it known that I, FRANK WILCOMB, a citizen of the United States, residing at Norristown, Pennsylvania, have invented certain new and useful Improvements in Let-Off and Controlling Means for Knitting-Machines, of which the following is a specification.

My invention relates to driving mechanism for knitting-machines, though I do not limit myself to the use of the invention with this style of machine.

In the drawings, Figure 1 is a sectional view through the knitting-head on line A A of Fig. 2 and along the drive-shaft on line B B of said figure. Fig. 2 is a plan view of my invention. Fig. 3 is a detail view of the throw-out finger, showing its relation to the knitting-head. Fig. 4 is a detail view showing the throw-out lever in its relation to the parts for operating it.

In the drawings, $a$ indicates generally the knitting-head. A gear $b$, connected to the knitting-head, meshes with a pinion $c$ on an upright shaft $d$, which is driven from the main driving-shaft $e$ through the bevel-gears $f$. The shaft $e$ is rotated through a pulley $g$, arranged loosely thereon to be slid longitudinally thereof to make its pins $i$ engage or disengage the pins of a clutch-wheel $j$. This clutch-wheel has its pins $k$ carried by a ring $l$, loosely connected with the wheel and having an inclined bearing-face engaging a similar face of a ring $m$, which is carried by screws $n$, passing through sockets in the clutch-wheel, said sockets containing springs $o$, bearing upon the heads of the screws and tending to force the screws so as to press the ring $m$ into frictional contact with the ring $l$. This frictional pressure is adjustable, the screws $n$ being accessible for adjustment at the face of the clutch-wheel. This clutch-wheel block is in the form of a hand-wheel. By adjusting the screws the friction-ring $l$ can be connected more or less firmly with the clutch-wheel, and thus more or less of its rotary motion imparted to it through the clutch-pins will be transmitted to the clutch block or wheel $j$, and consequently to the main driving-shaft, to which the clutch-block is fixed.

The belt-wheel is shifted longitudinally of the main driving-shaft through an arm $p$, engaging a groove $q$ in the hub of the pulley, said arm being operated through a link $r$, connected with a shipper-lever $s$, pivoted to a boss $t$ on the bearing of the main driving-shaft. For holding the pulley either in or out I employ a friction device to place the shipper connection under restraint, and this device comprises a friction-clutch $u$, composed of a number of jaws forming a conical-shaped head $v$ and arranged upon a rod $w$, connected with the shipper-arm $p$, before described. This rod passes through a stud $x$, formed on the shaft-bearing. The conical head of the friction device fits into a socket of corresponding shape formed in a block $y$, loose on the rod $w$, said block being pressed against the friction device to close the jaws thereof upon the rod by a spring $z$, surrounding the rod $w$ and bearing at its ends upon the stud $x$ and block $y$, respectively. When the friction device is maintained as to its position longitudinally of the shaft in the position shown in Fig. 1, the spring $z$ will force the block $y$ upon the conical head of the clutch, and thus cause the jaws thereof to grip the rod $w$ with sufficient friction to hold said rod in either position to which it may be moved through the operation of the shipper-lever, and the arm $p$ and the driving-pulley will be held by this friction device either in or out of engagement with clutch parts of the clutch-wheel. For holding the friction device against displacement longitudinally of the shaft $w$ I employ a spring-pin 1, carried by a lever 2, pivoted to the stud 3, in which the stem 4 of the friction device is guided. So long as this pin engages the head of the friction device, as shown, the clamp or clutch will hold the rod $w$ in either position. Supposing now that the friction device is held in this manner and the loose pulley is shifted toward the right, so that the clutch parts engage to drive the machine, this action will bring the stop-nut 5 against the end of the stem 4 of the friction device. If now the lever 2 is turned so as to remove the pin 1 from behind the conical head of the friction device, said device will be free to move leftward, which it will do under the action of the spring $z$, and the rod $w$ will also be carried along in this movement by the stem 4 bearing against the stop-nut 5. In this way the driving-pulley will be thrown out of engagement with the clutch-block by simply withdrawing the retaining-pin 1. In throwing the driving parts into connection again the lever $s$ is operated, and the rod $w$ with the friction device and block $y$ move therewith as one body, the stop-nut 5 bearing for this purpose on the stem of the friction device. Only the resistance of the spring $z$ has to be overcome in shifting the parts into gear, as the friction device, moving with the rod $w$, exercises no restraint thereon.

The pin 1 and lever 2 are utilized to control the driving connection from the automatic let-off mechanism, and it will be understood that at any time the rod $w$ can be operated by the shipper-lever $s$ directly either to engage or disengage the clutch.

The automatic let-off connection comprises a link 6, connected with the lever 2 and by a pin 10 with a ring 7, supported on a shoulder 8 of the base-ring 9 of the knitting-head. This ring has a depending pin 11 extending through an opening in a lever 12, pivotally connected to the base-ring at 13. This lever is adapted when raised to be operated by one of the pins 14, projecting downwardly from the gear $b$, and when moved by one of these pins the lever will, through the pin 11, move the ring and operate through the link 6 and lever 2 to withdraw the pin 1 and stop the machine. The lever 12 is held below the level of the pins 14 by a rod 15, having a fork 16 at its lower end engaging a groove 17 in the hub of the lever. The lever is pressed upwardly by a spring 17', surrounding the pin 11. The rod 15 is held down by the throw-out arm 18, pivoted at 19 to a stand 20 on the cylinder-casing, and said arm has a finger 21 extending close to the needles, so that if any lump or tangled portions of the yarn are fed to the needles the fingers will be struck thereby and moved aside, thus moving the let-off arm from over the rod 15, allowing the lever 12 to rise under the action of the spring 17, so that the end of the lever will be in the path of the pins 14, one of which will now operate the lever and ring 7 to withdraw the pin 1 and throw out the driving connections in the manner described. In order to immediately throw the retaining-pin 1 back to position ready to engage behind the conical head when the parts of the clutch are thrown into engagement by the lever $s$, I employ a cam-ring 22, carried by the gear $b$ and having a series of cam-surfaces 23.

When the lever 12 is struck by one of the pins 14 and turned, an arm 24 of the lever will be brought into line with the cam-surfaces 23, which acting thereon will depress the lever 12 out of engagement with the pin 14, and the rod 15, moving down with the lever, will be caught and held down by the throw-out arm, which swings over the end of the rod under the action of its spring 24' as soon as the rod 15 is lowered. When the lever 12 is lowered by the cam 23 out of contact with the pin 14, a spring 25, connected with the link 6 and with the frame, will turn the lever 12 back to normal position and will reset the pin 1 in its position directly over the center of the driving-shaft and friction device. In this action the retaining-pin will ride on the inclined surface of the friction device, the spring $l'$ yielding for this purpose. As soon as the shipper-lever is operated to engage the driving-clutch the rod $w$, moving toward the right in this action, will cause the conical head of the friction device to be moved so that the spring-pin will engage behind its edge and the rod will be held by the frictional restraint.

The lever 12 is formed with a recess at 26 in its upper side in order to allow the same to rise without striking the cam-ring 22.

I do not wish to limit myself to the retaining-pin 1 as the means for holding the friction device, as other means may be used when the automatic let-off is not wanted.

It will be noticed that in the let-off action the friction device is perfectly free to move without overcoming any of the friction heretofore referred to for holding the shipper in either position, the friction device and rod traveling together; but immediately the friction device has reached the limit of its traversing motion the jaws are compressed by the collar $y$ and the spring $z$, so that full efficiency is secured from the friction-jaws whether the retaining-pin is in engagement with the friction device or not. In other words, when the retaining-pin has locked the friction device the shipper-rod is frictionally held in any position it is placed by operating the hand-lever $s$; but when the retaining-pin lets go the friction device and the machine is to be stopped there is no frictional resistance to be overcome by the spring $z$, and the full force of this can be exerted on the connections to be operated. The jaws of the friction device being closed by the conical collar under the tension of the spring, the wear of the rod and jaws is taken up automatically and the friction is constant, requiring no adjustment.

While I have shown a clutch as the driving means, it will be understood that my invention can be carried out with other forms of driving means, as a belt-shifting arrangement, this having features which are the equivalent of features in the clutch form of driving means.

I claim—

1. In combination, with a shifting driving member, a friction device for holding the said member in either engaged or disengaged position to control the machine comprising conical portions in contact connected with the shifting driving member.

2. In combination with a shifting driving member, a friction device for holding the said member in either engaged or disengaged position to control the operation of the machine, comprising conical parts in contact, with a spring for forcing the parts together, and means connecting the friction devices with the shifting member, substantially as described.

3. In combination with a shifting driving member, a friction device connected with the shifting member for holding it in either engaged or disengaged position to control the operation of the machine, said friction device comprising friction-surfaces in contact with each other and means for automatically taking up wear, substantially as described.

4. In combination, a shifting driving member, a rod in connection with the member, a friction device on said rod independent of the shifting driving member for holding the same in either engaged or disengaged position and a spring for moving the rod longitudinally to shift the driving member to inoperative position.

5. In combination, a shifting driving member, a rod connected therewith, a friction device adapted to clamp the rod but movable longitudinally therewith, a spring bearing on the friction device to force the same with the rod to shift the driving member to inoperative position and means for holding the friction device against movement with the rod and against the tension of the spring to exert a frictional restraint on the rod, substantially as described.

6. In combination with a shifting driving member, a friction device for holding the same in or out of action, means connecting the said friction device with the said member, said friction device being movable bodily from operative position with the shifting member.

7. In combination with a shifting driving member, a friction device, connecting means between the said member and friction device, means for retaining the friction device in position to exercise frictional restraint on the shifting driving member, a spring for throwing the driving member out of action, said spring acting upon the frictional device to move the same bodily when released by the retaining device.

8. In combination, a shifting driving member, a friction holding device for holding the said member in or out of action, a retaining device for holding the friction device in one position, means for moving the friction device bodily to throw out of action, the shifting member, said friction device at the end of its movement acting to restrain the shifting member against reëngagement, substantially as described.

9. In combination, a shifting driving member, a rod connected therewith, a friction device on the rod comprising the conical jaws and the block having the conical socket, means to hold the jaws against movement with the rod, resilient means for pressing the parts of the friction device together and for operating the friction device with the rod longitudinally when the holding means is released.

10. In combination, a shifting driving member, a rod connected therewith, a friction device on the rod comprising the conical jaws and the block having the conical socket, means to hold the jaws against movement with the rod, resilient means for pressing the parts of the friction device together and for operating the friction device with the rod longitudinally when the holding means is released, said rod having a stop to be engaged by the friction device, substantially as described.

11. In combination, a shifting driving member, a friction device shiftable from one position to another and arranged to exercise restraint on the shifting driving member in each of the positions to which it may be shifted, said friction device relieving the driving member of restraint during the shifting action, and connecting means between the friction device and shifting driving member, substantially as described.

12. In combination, a shifting driving member, the conical friction device, a rod restrained thereby and moving with the shifting driving member, a spring-pin engaging the conical friction device, means for withdrawing the pin from the friction device and resetting the same to normal position, a spring for operating the friction device and rod, and the hand-lever for resetting the rod and friction device, substantially as described.

13. In combination, with a shifting driving member, means for holding the shifting driving member in either engaged or disengaged position, a retaining device for said means, connections for operating the said device to release the holding means and automatically-operating means for giving said connections a reverse movement to reset the retaining device, substantially as described.

14. In combination, a shifting driving member, the holding friction device comprising the conical part, connecting means between the driving member and holding device, a spring retaining-pin for said friction device and means controlling the said pin, substantially as described.

15. In combination, a shifting driving member, the holding means therefor, the retaining device for said means to hold the driving member in operation, connections for operating the retaining device to release the driving member and means carried by a moving part of the machine to reset the retaining device by the momentum of the machine, substantially as described.

16. In combination, a shifting driving member, holding means for the same, connections between the holding means and a moving part of the machine to operate the holding means to release the driving member, and means moving with the machine to reset the holding means for the driving member as the machine is coming to rest, substantially as described.

In testimony whereof I affix my signature in presence of two witnesses.

FRANK WILCOMB.

Witnesses:
F. B. WILDMAN,
OLGA M. RAKERD.